(12) United States Patent
Hivet et al.

(10) Patent No.: US 12,296,559 B2
(45) Date of Patent: May 13, 2025

(54) GLAZING COMPRISING A FUNCTIONAL COATING AND AN ABSORBENT ELEMENT FOR COLORIMETRIC ADJUSTMENT

(71) Applicant: SAINT-GOBAIN GLASS FRANCE, Courbevoie (FR)

(72) Inventors: Romain Hivet, Orvault (FR); Xavier Caillet, Fontenay sous Bois (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/569,923

(22) PCT Filed: Jun. 17, 2022

(86) PCT No.: PCT/FR2022/051181
§ 371 (c)(1),
(2) Date: Dec. 13, 2023

(87) PCT Pub. No.: WO2022/263785
PCT Pub. Date: Dec. 22, 2022

(65) Prior Publication Data
US 2024/0278541 A1 Aug. 22, 2024

(30) Foreign Application Priority Data
Jun. 18, 2021 (FR) ...................................... 2106501

(51) Int. Cl.
*B32B 15/04* (2006.01)
*B32B 17/06* (2006.01)
*B32B 17/10* (2006.01)

(52) U.S. Cl.
CPC .. *B32B 17/10449* (2013.01); *B32B 17/10229* (2013.01); *B32B 17/10651* (2013.01); *B32B 2307/4026* (2013.01); *B32B 2311/08* (2013.01)

(58) Field of Classification Search
CPC .......... B32B 17/10229; C03C 17/3613; C03C 17/366
(Continued)

(56) References Cited

U.S. PATENT DOCUMENTS 7,166,360 B2 * 1/2007 Coustet ............... C03C 17/3639
428/428
11,174,196 B2 * 11/2021 Mariani .............. C03C 17/3626
(Continued)

FOREIGN PATENT DOCUMENTS

EP 2 543 647 A1 1/2013
JP 2017-207626 A 11/2017
(Continued)

OTHER PUBLICATIONS

KR International Search Report as issued in International Patent Application No. PCT/FR2022/051181, dated Sep. 6, 2022.

*Primary Examiner* — Lauren R Colgan
(74) *Attorney, Agent, or Firm* — Pillsbury Winthrop Shaw Pittman LLP

(57) ABSTRACT

A material includes one or more transparent substrates including two main surfaces, of which one of the surfaces of one of the substrates is coated with a functional coating capable of controlling solar radiation, the material including an absorbent layer for colorimetric adjustment of which the average absorption peak is centered between 500 and 555 nm and of which the full width at half maximum is less than 50 nm. The solar glazing has an improved aesthetic appearance without overly affecting thermal performance.

13 Claims, 3 Drawing Sheets

(58) Field of Classification Search
USPC .................................. 428/426, 428, 432, 434
See application file for complete search history.

(56) References Cited

U.S. PATENT DOCUMENTS

| | | | | |
|---|---|---|---|---|
| 2011/0305853 A1* | 12/2011 | Reymond | ............ | C03C 17/3681 |
| | | | | 427/160 |
| 2012/0087005 A1* | 4/2012 | Reymond | ............ | C03C 17/3626 |
| | | | | 359/360 |
| 2020/0055285 A1* | 2/2020 | Compoint | ......... | B32B 17/10972 |

FOREIGN PATENT DOCUMENTS

| | | |
|---|---|---|
| JP | 2018-150584 A | 9/2018 |
| WO | WO 2006/043026 A1 | 4/2006 |
| WO | WO 2018/178547 A1 | 10/2018 |
| WO | WO 2018/197821 A1 | 11/2018 |
| WO | WO 2019/015917 A1 | 1/2019 |
| WO | WO 2019/066429 A1 | 4/2019 |
| WO | WO 2019/097192 A1 | 5/2019 |

* cited by examiner

[Fig. 1]
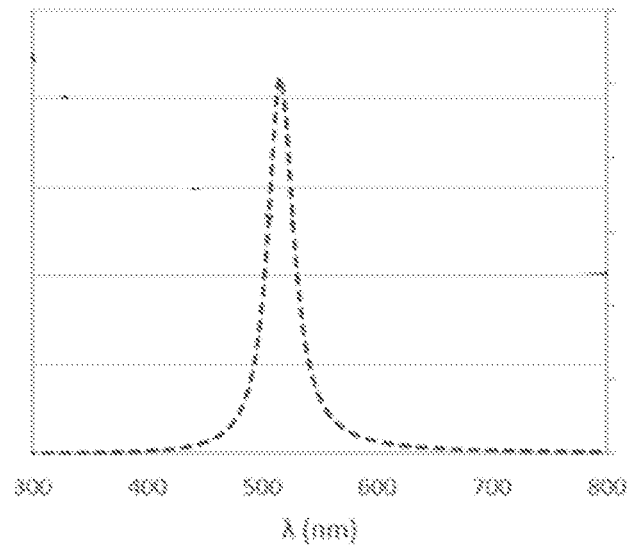
[Fig. 2]
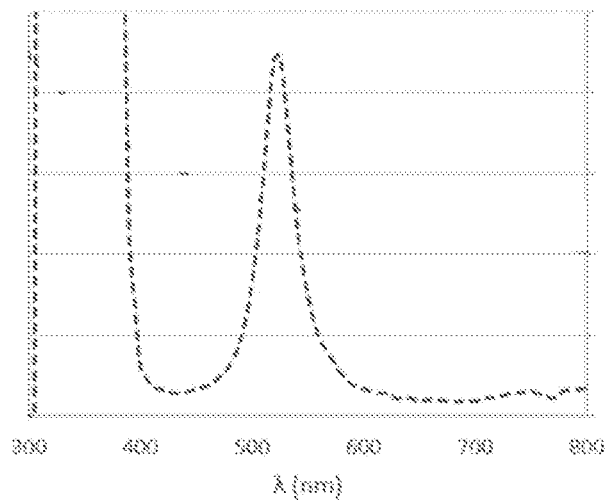

[Fig. 3]
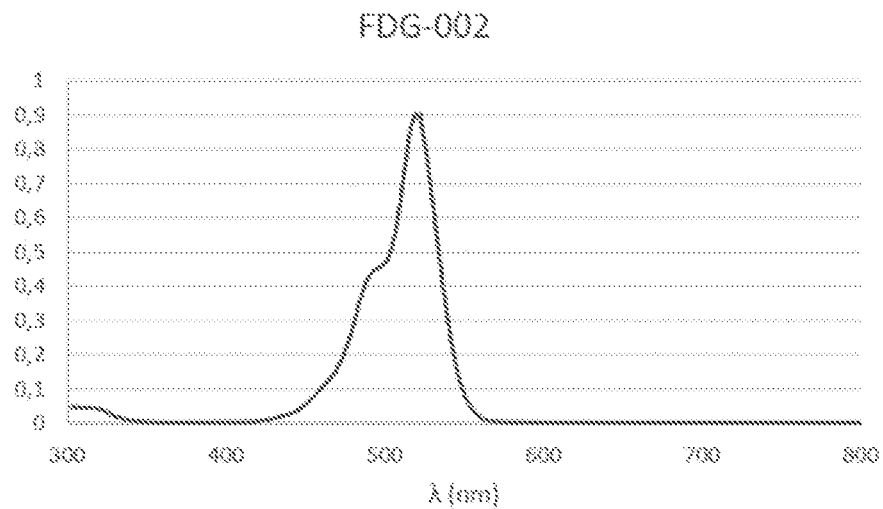
[Fig. 4]
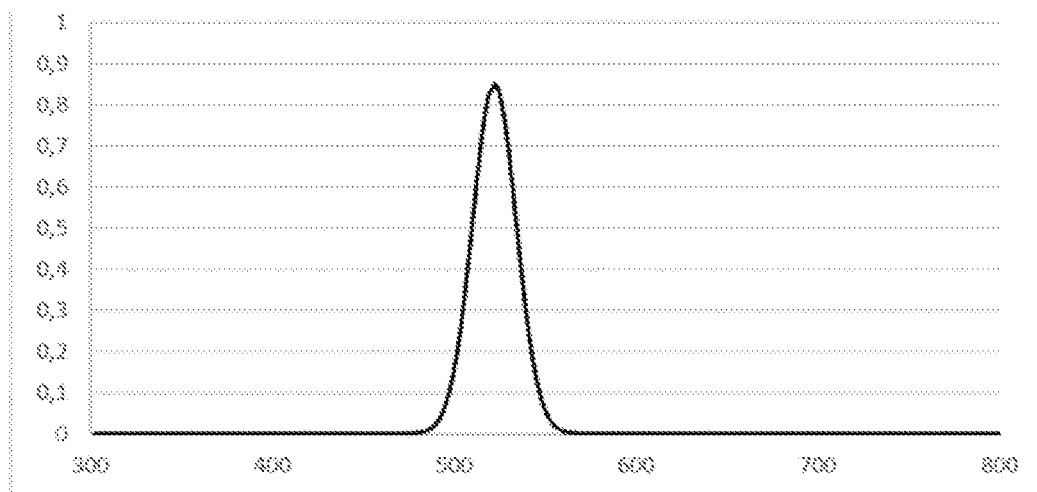

[Fig. 5]
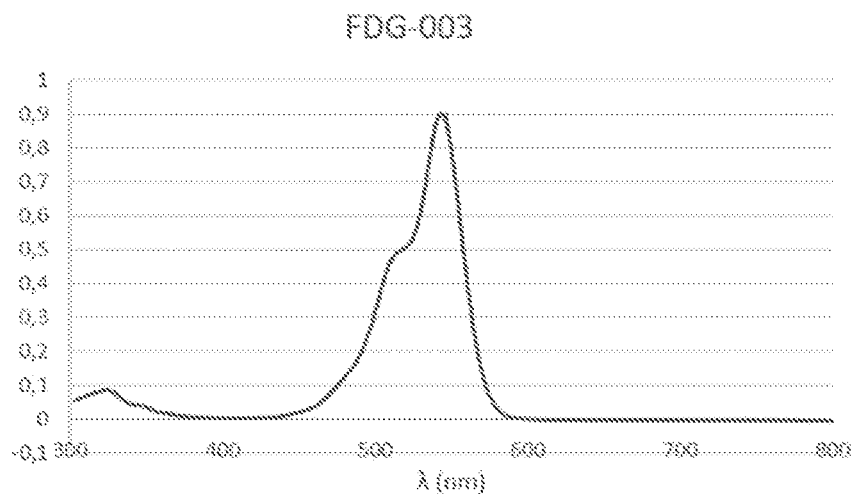
[Fig. 6]
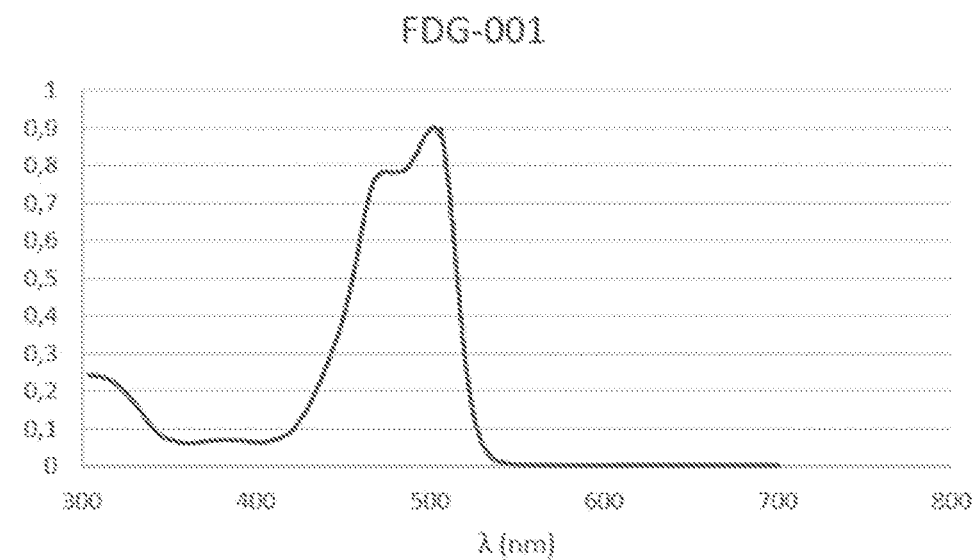

GLAZING COMPRISING A FUNCTIONAL COATING AND AN ABSORBENT ELEMENT FOR COLORIMETRIC ADJUSTMENT

CROSS-REFERENCE TO RELATED APPLICATIONS

This application is the U.S. National Stage of PCT/FR2022/051181, filed Jun. 17, 2022, which in turn claims priority to French patent application number 2106501 filed Jun. 18, 2021. The content of these applications are incorporated herein by reference in their entireties.

The invention relates to a material comprising a transparent substrate coated with a functional coating which can influence solar radiation and/or infrared radiation. The invention also relates to the glazings comprising these materials and also to the use of such materials for manufacturing thermal insulation and/or solar protection glazings.

In the following description, the term "functional" as used in "functional coating" means "which can act on solar radiation and/or infrared radiation".

These glazings can be intended both to equip both buildings and vehicles, in particular to reduce the energy needed for air conditioning and/or prevent excessive overheating, known as "solar control" glazings.

Depending on the climates of the countries in which these glazings are installed, particularly depending on the amount of sunshine, the desired performance properties in terms of light transmission and solar factor may vary. As a result, different ranges of glazings characterized by their level of light transmission are developed.

For example, in countries with high levels of sunshine, there is a great demand for glazings having a light transmission of the order of 40% and sufficiently low solar factor values. In countries where the levels of sunshine are lower, a higher light transmission is sought.

The selectivity "S" enables the performance of these glazings to be evaluated. It corresponds to the ratio of light transmission $TL_{vis}$ in the visible range of the glazing to the solar factor SF of the glazing ($S=TL_{vis}/SF$). Solar factor "SF or g" is understood to mean the ratio in % of the total energy entering the premises through the glazing to the incident solar energy.

Obtaining a high selectivity must not be done to the detriment of the aesthetic appearance and in particular of the color. In general, it is desired to obtain as neutral an appearance as possible in external and internal reflection, as well as in transmission.

The conventional approach to obtain both high selectivity and excellent color neutrality consists in developing increasingly sophisticated functional coatings.

Known selective glazings comprise transparent substrates coated with a functional coating comprising a stack of several metallic functional layers, each arranged between two dielectric coatings. Such glazings make it possible to improve solar protection while retaining a high light transmission. These functional coatings are generally obtained by a sequence of depositions carried out by cathode sputtering, optionally assisted by a magnetic field.

Conventionally, the surfaces of a glazing are designated starting from the exterior of the building and by numbering the surfaces of the substrates from the outside towards the inside of the passenger compartment or of the premises which it equips. This means that the incident sunlight passes through the surfaces in increasing numerical order.

The known selective glazings are generally double glazings comprising the functional coating located on surface 2, that is on the outermost substrate of the building, on its surface turned toward the interlayer gas gap.

Adapting the colorimetry of these glazings is achieved by adjusting the nature, the thicknesses of the layers or coatings forming the functional coatings.

The invention specifically relates to highly selective glazings comprising complex silver-based functional coatings.

These silver-based functional coatings are described as complex based on the number of layers constituting them, the nature of the materials constituting these layers, and the adjustment of the thickness of these layers.

Indeed, silver-based functional coatings are generally more efficient in terms of selectivity relative to other known infrared-reflecting functional coatings, such as coatings comprising conductive oxide-based layers.

The complexity of the functional coatings makes it difficult to obtain both good thermal performance and a particular aesthetic appearance, such as excellent color neutrality.

Finally, the complexity of these functional coatings also makes it difficult to maintain a constant production quality for a given functional coating. Indeed, by multiplying the number of layers and materials forming these functional coatings, it is increasingly difficult to adapt the settings of the deposition conditions in order to obtain functional coatings of identical color originating from two batches produced on the same production site or of two batches produced on two different production sites.

The more silver-based functional layers there are, the more possible it is to increase the selectivity. In particular, functional coatings exist including 1, 2, 3, or 4 silver-based layers. The selectivities achieved in double glazings by virtue of these coatings are respectively 1.2, 1.8, 2.2 and 2.25. Three-layer silver stacks are for example described in WO 2019/015917. The glazings which include these stacks are generally slightly greenish in transmission.

One way of increasing selectivity consists of further increasing the number of reflective layers in the IR. However, the proliferation of the agent layers affects the transmission spectrum of the glazings, which take on a green hue. The glazings which include these complex functional coatings are generally slightly greenish or yellowish in transmission.

Document WO 2006/043026 describes a solar control glazing with very low light transmission, in particular laminated including a solar control coating ("low E") on one surface and an absorbent layer which absorbs radiation with a wavelength greater than 400 nm on another surface. The absorbent layers described are based on Ti or NiCrN & TiN. It is specified that the absorption in the visible and the IR is substantially constant over the entire spectrum of 400 nm to 100 µm. The TL obtained are 14 and 15%, which limits the applications of these glazings to "privacy glazings". The energy efficiency is quite low, these glazings are not very selective.

Document WO 2018/197821 teaches colored glazings composed of a clear glass substrate on which a colored coating is deposited, whose colorimetric characteristics are easily adjustable and modifiable. The coating includes metal nanoparticles in an inorganic matrix of an oxide, for example TiOx:Ag. In the various examples described, the colored coatings have a plasmonic absorption peak at 550 nm, 480 nm, 520 nm, and 610 nm (Examples A to D) and 490, 440 and 420 nm (examples E to G), respectively. For examples A to D, we can see in FIG. 1 that the half-height widths are respectively 567, 138, 180 and 194 nm. The desired goal was not energy efficiency, but rather to provide colored glazings.

The aim of the invention is therefore to develop a solar control glazing, in particular the transmission of which is between 30 and 80%, having an improved aesthetic appearance without excessively affecting thermal performance, in particular selectivity. The sought aesthetic is, in particular, to avoid the greenish transmission color, or to achieve the most neutral color possible.

The applicant has developed a new solution making it possible to adapt the colorimetry of the glazings comprising functional coatings without modifying the complex stack of these functional coatings.

The applicant has identified that the greenish appearance is attributable in part to the fact that the glazings comprising functional coatings based on a metal layer, in particular based on silver, exhibit transmission spectra that peak around 550 nm. This phenomenon is accentuated with the number of functional layers in the coating.

The proposed solution consists of adding a particular absorbent element for colorimetric adjustment that selectively absorbs solar radiation in a very limited part of the visible spectrum. In particular, the absorbent element is an absorbent layer that has an absorption profile with a peak centered between 505 and 555 nm, in particular between 520 and 530 nm.

The inventors have discovered that the addition of an absorbent layer, selectively absorbing the visible wavelengths responsible for the green color, whose peak is particularly fine makes it possible to maintain thermal performance, in particular the selectivity remains high if the absorption peak of the absorbent element has a full width at half maximum less than 50 nm, preferably less than 40 nm.

The present invention makes it possible to create a satisfactory material without readjusting a complex functional coating. The invention proposes a method for neutralizing the green color of a material comprising an existing functional coating by inserting a green-absorbing layer.

The absorption profile in the visible is determined by producing the absorption spectrum. It corresponds to the variations in the absorbance as a function of wavelength.

The absorbent layer may be a layer deposited on one of the surfaces of the glazing, preferably by wet-laying, or may consist of one of the substrates or of at least one interlayer sheet. The absorbent layer has substantially the same surface area as the functional coating.

The invention relates to a material comprising one or more transparent substrates, each substrate comprising two main surfaces
  one of the surfaces of one of the substrates being coated with a functional coating capable of controlling solar radiation and/or infrared radiation, this coating comprising at least one metallic functional layer,
  characterized in that it includes an absorbent layer for colorimetric adjustment, the average absorption peak of which is centered between 500 and 555 nm, preferably centered between 510 and 540 nm and whose full width at half maximum is less than 50 nm, preferably less than 40 nm.

In order to calculate the effective position of the average absorption peak, even if the peak is not entirely regular, the wavelength is not considered to be the maximum absorption value but rather the central wavelength value of the peak at mid-height.

In particular, the absorbent layer includes an organic pigment, for example of the eosin type.

In particular, the material according to the invention equipping a building or passenger compartment comprises at least two transparent substrates, the surfaces of each substrate being numbered from the exterior toward the interior of the building or passenger compartment, the functional coating being arranged on the interior surface of the outermost substrate (surface 2).

In the case of a laminated glazing, the material further includes a lamination interlayer, in this case, the absorbent layer may consist of the lamination interlayer which comprises an organic pigment (tinted interlayer).

However, the absorbent layer may also consist of one of the substrates (colored glass).

Advantageously, the absorbent layer consists of a layer deposited on one of the surfaces of one of the substrates. The layer is deposited by any known technique for depositing layers, in particular by wet-laying.

The functional coating capable of controlling solar radiation and/or infrared radiation comprises one or more metallic functional layers, generally silver-based, each arranged between two dielectric coatings.

The functional coating may especially comprise one, two, three or four metallic functional layers.

The functional coating is generally deposited by magnetic-field-assisted cathode sputtering (magnetron method).

The material according to the invention could also comprise several colorimetric adjustment layers.

The invention has the advantage of decoupling the obtaining of energy performance (selectivity, etc.), which is largely ensured by the functional coating, and obtaining aesthetic appearance, which is ensured by the absorbent layer for colorimetric adjustment. The absorbent layer for colorimetric adjustment does influence the energy performance levels, but to a lesser extent.

Finally, the solution of the invention has the additional advantage, starting from one and the same functional coating with high light transmission, of obtaining an entire range of glazing with lower light transmission and/or of varied color. It is no longer necessary to develop, for each light transmission range, a complex functional coating having both the energy performance and the colorimetric properties. It is sufficient, starting from the same complex functional coating, to select the absorbent layer for colorimetric adjustment with a less complex structure to make it possible to obtain the desired colors.

The material according to the invention can be in the form of a monolithic, laminated and/or multiple glazing, in particular a double glazing or triple glazing with a laminated exterior glass.

A monolithic glazing comprises a material comprising a transparent substrate. The surface 1 is outside the building and thus constitutes the exterior wall of the glazing and surface 2 is inside the building and thus constitutes the interior wall of the glazing.

A multiple glazing comprises at least two substrates separated by at least one interlayer gas gap. The glazing provides a separation between an exterior space and an interior space.

A double glazing, for instance, includes 4 surfaces, surface 1 is outside the building and thus constitutes the exterior wall of the glazing, surface 4 is inside the building and thus constitutes the interior wall of the glazing, surfaces 2 and 3 being inside the double glazing.

A laminated glazing comprises at least two substrates separated by at least one lamination interlayer. A laminated glazing therefore includes at least one structure of the material/lamination interlayer/additional substrate type. In the case of a laminated glazing, all the surfaces of the additional materials and substrates are numbered but the surfaces of the laminating interlayers are not numbered. The surface 1 is outside the building and thus constitutes the exterior wall of the glazing, surface 4 is inside the building and thus constitutes the interior wall of the glazing, surfaces 2 and 3 being in contact with the lamination interlayer.

A multiple laminated glazing comprises at least three substrates, at least one interlayer gas gap, and at least one lamination interlayer.

All the light characteristics presented in the description are obtained according to the principles and methods described in the European standard EN 410 relating to the determination of the light and solar characteristics of the glazings used in glass for the construction industry.

Conventionally, the refractive indices are measured at a wavelength of 550 nm.

The light characteristics are measured according to the illuminant D65 at 2° perpendicular to the material mounted in a double glazing (unless otherwise indicated):

TL corresponds to the light transmission in the visible region in %,

Rext corresponds to the external light reflection in the visible region as a %, observer on the side of the exterior space, Rint corresponds to the interior light reflection in the visible region as a %, observer on the side of the interior space, $a^*T$ and $b^*T$ correspond to the colors in transmission $a^*$ and $b^*$ in the $L^*a^*b^*$ system, $a^*Rext$ and $b^*Rext$ correspond to the colors in reflection $a^*$ and $b^*$ in the $L^*a^*b^*$ system, observer on the side of the exterior space, $a^*Rint$ and $b^*Rint$, correspond to the colors in reflection $a^*$ and $b^*$ in the $L^*a^*b^*$ system, observer on the side of the interior space.

Unless otherwise indicated, the colorimetric properties such as the values $L^*$, $a^*$ and $b^*$ and all the values and ranges of values of optical and thermal characteristics such as selectivity, external or internal light reflection, and light transmission and are calculated with:

materials comprising a substrate coated with a functional coating mounted in a double glazing, the double glazing has a configuration: 6-16(Ar-90%)-4, that is to say a configuration consisting of a material comprising a 4 mm substrate of ordinary soda-lime glass and another 4 mm glass substrate of soda-lime glass, the two substrates are separated by an interlayer gas gap formed of 90% argon and 10% air, with a thickness of 16 mm.

the functional coating is preferably positioned on surface 2.

One objective of the invention may be to obtain an exceptionally neutral aesthetic in exterior reflection, interior reflection, and transmission. Preferably, neutrality in transmission is preferred. According to the invention, neutral hues in external reflection, internal reflection or in transmission, are defined by:

values of $a^*$ comprised, by increasing order of preference, between −5 and +5, between −4 and +4, between −3 and +3, between −2 and +2, between −1 and +1.

values of $b^*$ comprised, by increasing order of preference, between −5 and +5, between −4 and +4, between −3 and +3, between −2 and +2, between −1 and +1.

These glazings according to the invention are mounted on a building or a vehicle.

The invention therefore also relates to a glazing mounted on a vehicle or on a building.

In a double glazing configuration, the present invention makes it possible to obtain a very high selectivity S, in particular greater than 1.7 or even greater than 1.9, a solar factor (SF) less than 30%, or even less than 28%, neutral colors in transmission and in external and interior reflection.

The invention also relates to the use of a glazing according to the invention as solar-control glazing for buildings or vehicles.

The preferred characteristics which appear in the remainder of the description are applicable both to the material and to the glazing according to the invention and, where appropriate, to the use, the building or the vehicle according to the invention.

In the present description, unless otherwise indicated, the expression "based on", used to characterize a material or a layer with respect to what it contains, means that the mass fraction of the constituent that it comprises is at least 50%, in particular at least 70%, preferably at least 90%.

Unless otherwise mentioned, the thicknesses mentioned in the present document, without other information, are real or geometrical physical thicknesses denoted Ep and are expressed in nanometers (and not optical thicknesses).

According to the invention:

light reflection corresponds to the reflection of the solar radiation in the visible part of the spectrum, light transmission corresponds to the transmission of solar radiation in the visible part of the spectrum, light absorption corresponds to the absorption of solar radiation in the visible part of the spectrum.

In order to obtain a glazing falling within a certain range of light transmission, a functional coating is chosen falling within a higher range of light transmission to which the absorbent layer for colorimetric adjustment is added.

The transparent substrates according to the invention are preferably made of a rigid inorganic material, such as made of glass, or are organic, based on polymers (or made of polymer).

The substrate is preferably a sheet of glass.

The substrate is preferably transparent, colorless (it is then a clear or extra-clear glass). The glass is preferably soda-lime-silica type but it can also be a glass of borosilicate or alumino-borosilicate type.

According to a preferred embodiment, the substrate is made of glass, especially soda-lime-silica glass, or of polymer organic material.

The substrate may be flat or bent, or even flexible.

The material may undergo a high-temperature heat treatment, such as an annealing, for example by a flash annealing, such as a laser or flame annealing, a tempering and/or a bending.

According to advantageous embodiments, the glazing of the invention in the form of double glazing comprising the functional coating positioned on surface 2 allows the following performances in particular to be achieved:

a solar factor g less than or equal to 35%, preferably less than 30%, more preferably less than or equal to 29% and/or a light transmission of between 25 and 80%, preferably between 40% and 70%, high selectivity, at least 1.7, and/or values of $a^*$ and $b^*$ in external reflection, by increasing order of preference, between −5 and +5, between −4 and +4, between −3 and +3, between −2 and +2, between −1 and +1, and/or values of a* and b* in internal reflection, by increasing order of preference, between −5 and +5, between −4 and +4, between −3 and +3, between −2 and +2, between −1 and +1, and/or values of a* and b* in transmission, by increasing order of preference, between −5 and +5, between −4 and +4, between −3 and +3, between −2 and +2, between −1 and +1.

The details and advantageous features of the invention will become apparent from the following non-limiting examples with reference to the figures, wherein:

FIG. 1 shows the absorption profile (optical indices n and k) of the layer containing the pigment used in example 1.

FIG. 2 shows the absorption profile (optical index n and k) of the absorbent layer used in example 2.

FIG. 3 shows the absorption profile of the pigment used in example 3.

FIG. 4 shows the absorption profile (absorbency value) of the pigment used in example 4.

FIG. 5 shows the absorption profile (absorbency value) of the pigment used in example 5.

FIG. 6 shows the absorption profile (absorbency value) of the pigment used in example 4.

EXAMPLES

Comparative Example 1

1. Functional Coating

A simplified functional coating (RF1) with three Ag layers was deposited by means of a magnetic-field-assisted (magnetron) sputtering device on a substrate made of clear soda-lime glass 6 mm thick. It has a stack of:

Glass/$Si_3N_4$ 158 nm/Ag 12 nm/$Si_3N_4$ 75 nm/Ag 21 nm/$Si_3N_4$ 77 nm/Ag 13 nm/$Si_3N_4$ 155 nm.

II. Configuration of the Glazing

A 6/16/4 double glazing was produced with the functional coating (RF1) above on surface 2, such that the following are obtained:

6 mm glass/RF1/16 mm space filled with 90% argon and 10% air/4 mm glass.

Example 1

I. Functional Coating and Configuration of the Glazing

The functional coating RF1 and the glazing configuration are the same as those of comparative example 1 above.

II. Absorbent Elements

An absorbent layer (CA) comprising a pigment is produced. The absorption profile of the layer is shown in FIG. 1. It has an average peak centered at 515 nm and whose full width at half maximum is 27 nm.

The thickness of the layer and the concentration of the pigment must be adapted as a function of the intensity of the coloring of the functional coating to be neutralized.

II. Configuration of the Glazing

A 6/16/4 double glazing was produced with the functional coating (RF1) above on surface 2, and the absorbent layer deposited on surface 3 using conventional wet-laid techniques, such that the resulting structure is:

6 mm glass/RF1/16 mm space filled with 90% argon and 10% air/CA/4 mm glass.

Comparative Example 2

I. Functional Coating

The same functional covering (RF1) as in comparative example 1 is used.

II. Configuration of the Glazing

A double laminated glazing is produced according to the configuration 44.1/16/4, that is to say:

4 mm glass/PVB/4 mm glass/RF/16 mm space filled with 90% argon and 10% air/4 mm glass.

Example 2

I. Functional Coating

The same functional covering (RF1) as in comparative example 1 is used.

II. Absorbent Elements

A colored PVB, 0.38 mm thick, having an absorption profile as shown in FIG. 2 was used. The index k has an average peak centered at 525 nm, whose full width at half maximum is 37 nm.

III. Configuration of the Glazing

A double laminated glazing is produced according to the same configuration as in comparative example 2 but using a colored PVB ("polyvinyl butyral") sheet:

4 mm glass/colored PVB/4 mm glass/RF/16 mm space filled with 90% argon and 10% air/4 mm glass.

"Solar Control" and Colorimetry Performance

Table 1 below lists the main optical characteristics of the double glazing according to example 1 and according to comparative example 1 and also double-laminated according to example 2 and according to comparative example 2.

TABLE 1

|  | comparative 1 | Example 1 according to the invention | Comparative 2 | Example 2 according to the invention |
|---|---|---|---|---|
| TL (%) | 60.00 | 57.28 | 59.45 | 54.55 |
| a*T | −7.21 | −2.60 | −7.61 | −0.10 |
| b*T | 3.05 | 1.40 | 3.38 | 0.07 |
| Rext (%) | 12.4 | 12.25 | 12.25 | 10.84 |
| a*Rext | −0.84 | −0.15 | −1.49 | 5.50 |
| b*Rext | −4.55 | −4.81 | −3.95 | −6.88 |
| Rint (%) | 16.46 | 15.25 | 16.43 | 16.17 |
| a*Rint | −1.52 | 3.73 | −1.56 | −0.66 |
| b*Rint | 0.33 | −1.61 | 0.36 | −0.03 |
| g (%) | 24.95 | 24.90 | 24.58 | 23.43 |
| selectivity | 2.40 | 2.30 | 2.42 | 2.33 |

With example 1, it can be seen that adding the absorbent layer has made it possible to attenuate the green color in transmission quite well (a*T goes from −7.21 to −2.60), without significantly impacting the other colors, nor TL, nor thermal performance. The selectivity (S=TL/g) goes from 2.40 to 2.30.

The ratio Δa*T/ΔTL is: 1.40.

With example 2, it can be seen that replacing the conventional PVB with colored PVB has made it possible to attenuate the green color in transmission very well (a*T goes from −7.61 to −0.10), without significantly impacting the other colors, nor TL, nor thermal performance. The selectivity (S=TL/g) goes from 2.42 to 2.33.

The ratio Δa*T/ΔTL is: 1.53.

Examples 3, 4, and 5 According to the Invention

I. Functional Coating RF2

A simplified functional coating (RF2) with three Ag layers was deposited by means of a magnetic-field-assisted (magnetron) sputtering device on a substrate made of clear soda-lime glass thick. In a simplified manner, it has a stack of:

Glass/Di1/Ag/Di2/Ag/Di3/Ag/Di4 with a total thickness of the Ag layer of about 40 nm; Di1 at 4 representing dielectric coatings that can contain several layers.

II. Absorbent Layers

Various dyes sold by Yamada Chemical Co., Ltd, available under the product codes FDG, were tested.

They are incorporated into a silicon layer of the same index as the glass substrate so as to form an absorbent layer (CA) which can be deposited by a conventional wet-laid technique.

The thickness of the layer and the concentration of the pigment will be adapted as a function of the intensity of the coloring of the functional coating to be neutralized.

Example 3 uses the dye FDG-002. The layer has an absorption profile as shown in FIG. 3. The average absorption peak is centered at 514 nm. The full width at half maximum is 42 nm.

Example 4 uses the same dye FDG-002, but only the main peak thereof has been preserved. The absorption profile of the layer is shown in FIG. 4. The average absorption peak is centered at 522 nm. The full width at half maximum is 29 nm.

Example 5 uses the dye FDG-003. The layer has an absorption profile as shown in FIG. 5. The average absorption peak is centered at 534 nm. The full width at half maximum is 40 nm.

Comparative Example 3

I. Functional Coating RF2

The same RF functional coating as in examples 3, 4 and 5 is used.

II. Absorbent Layer

No absorbent layer

Comparative Example 4

I. Functional Coating RF2

The same RF functional coating as in examples 3, 4 and 5 is used.

II. Absorbent Layer

Comparative example 4 uses the dye FDG-001. This absorbent layer has an absorption profile as shown in FIG. 6. The average absorption peak is centered at 485 nm. The full width at half maximum is 63 nm.

III. Configurations of the Glazing

Three different configurations were tested for each of examples 3, 4 and 5 according to the invention and for comparative examples 3 and 4.

Configuration a:

A 6/16/4 double glazing was produced with the functional coating (RF2) above on surface 2 and an absorbent layer (CA) on surface 3, such that the following are obtained:

6 mm glass/RF2/16 mm space filled with 90% argon and 10% air/CA/4 mm glass.

Configuration b:

A double laminated glazing is produced according to configuration 44.1/16/4 with the functional coating (FR2) on surface 4 and the absorbent layer (CA) on surface 2, such that the following are obtained:

4 mm glass/CA/PVB/4 mm glass/RF2/16 mm space filled with 90% argon and 10% air/4 mm glass.

Configuration c:

A double laminated glazing is produced according to configuration 44.1/16/4 with the functional coating (FR2) on surface 4 and the absorbent layer (CA) on surface 5, such that the following are obtained:

4 mm glass/PVB/4 mm glass/RF2/16 mm space filled with 90% argon and 10% air/CA/4 mm glass.

"Solar Control" and Colorimetry Performance

Table 2 below lists the main optical characteristics of examples 3, 4 and 5 and comparative examples 3 and 4, in the glazing configuration a.

TABLE 2

|  | Ex C3 | Ex C4 | Ex 3 | Ex 4 | Ex 5 |
| --- | --- | --- | --- | --- | --- |
| S | 2.14 | 2.13 | 2.06 | 2.06 | 2.06 |
| g (%) | 28.00 | 27.98 | 27.94 | 27.95 | 27.96 |
| TL (%) | 60.00 | 59.65 | 57.52 | 57.50 | 57.50 |
| a*T | −5.54 | −5.09 | −0.79 | −0.49 | −1.61 |
| b*T | 4.51 | 5.17 | 3.19 | 2.41 | 2.40 |
| Rext (%) | 14.00 | 13.98 | 13.87 | 13.87 | 13.86 |
| a*Rext | −3.40 | −3.33 | −2.75 | −2.72 | −2.85 |
| b*Rext | −9.06 | −9.00 | −9.27 | −9.36 | −9.37 |
| Rint (%) | 17.01 | 16.84 | 15.91 | 15.90 | 15.89 |
| a*Rint | −5.90 | −5.45 | −1.01 | −0.72 | −1.80 |
| b*Rint | −6.04 | −5.43 | −7.51 | −8.24 | −8.27 |

Table 3 below lists the main optical characteristics of examples 3, 4 and 5 and comparative examples 3 and 4, in the glazing configuration b.

TABLE 3

|  | Ex C3 | Ex C4 | Ex 3 | Ex 4 | Ex 5 |
| --- | --- | --- | --- | --- | --- |
| S | 2.19 | 2.20 | 2.17 | 2.16 | 2.15 |
| g (%) | 27.11 | 26.89 | 26.65 | 26.67 | 26.72 |
| TL (%) | 59.45 | 59.10 | 57.92 | 57.50 | 57.50 |
| a*T | −5.97 | −5.52 | −3.04 | −2.04 | −2.90 |
| b*T | 4.86 | 5.52 | 4.04 | 3.23 | 3.21 |
| Rext (%) | 13.83 | 13.70 | 13.30 | 13.17 | 13.16 |
| a*Rext | −3.90 | −3.52 | −1.23 | −0.38 | −1.12 |
| b*Rext | −8.49 | −7.97 | −9.31 | −9.99 | −10.00 |
| Rint (%) | 16.98 | 16.96 | 16.89 | 16.87 | 16.87 |
| a*Rint | −5.95 | −5.89 | −5.59 | −5.48 | −5.57 |
| b*Rint | −6.02 | −5.96 | −6.13 | −6.22 | −6.22 |

Table 4 below lists the main optical characteristics of examples 3, 4 and 5 and comparative examples 3 and 4, in the glazing configuration c.

TABLE 4

|  | Ex C3 | Ex C4 | Ex 3 | Ex 4 | Ex 5 |
| --- | --- | --- | --- | --- | --- |
| S | 2.19 | 2.18 | 2.12 | 2.12 | 2.12 |
| g (%) | 27.11 | 27.09 | 27.06 | 27.08 | 27.08 |
| TL (%) | 59.45 | 59.10 | 57.50 | 57.50 | 57.50 |
| a*T | −5.97 | −5.52 | −2.24 | −2.04 | −2.90 |
| b*T | 4.86 | 5.52 | 3.82 | 3.23 | 3.21 |
| Rext (%) | 13.83 | 13.81 | 13.72 | 13.72 | 13.72 |
| a*Rext | −3.90 | −3.83 | −3.38 | −3.36 | −3.47 |
| b*Rext | −8.49 | −8.43 | −8.66 | −8.72 | −8.73 |
| Rint (%) | 16.98 | 16.81 | 16.10 | 16.10 | 16.09 |
| a*Rint | −5.95 | −5.50 | −2.05 | −1.85 | −2.72 |
| b*Rint | −6.02 | −5.41 | −7.20 | −7.76 | −7.78 |

For each of the three configurations, the following conclusions can be drawn.

With example 3, it can be seen that adding the absorbent layer has made it possible to attenuate the green color in transmission quite well (a*T goes from −5.97 to −2.24), without significantly impacting the other colors, nor TL, nor thermal performance. The selectivity (S=TL/g) goes from 2.19 to 2.12.

The ratio Δa*T/ΔTL is: 1.9 and the ratio Δa*T/ΔTL is 0.5

With example 4, it can be seen that adding the absorbent layer has made it possible to attenuate the green color in transmission quite well (a*T goes from −5.97 to −2.04), without significantly impacting the other colors, nor TL, nor thermal performance. The selectivity (S=TL/g) goes from 2.19 to 2.12.

The ratio Δa*T/ΔTL is: 2.0 and the ratio Δa*T/ΔTL is 0.8.

With example 5, it can be seen that adding the absorbent layer has made it possible to attenuate the green color in transmission (a*T goes from −5.97 to −2.90), without significantly impacting the other colors, nor TL, nor thermal performance. The selectivity (S=TL/g) goes from 2.19 to 2.12.

The ratio Δa*T/ΔTL is: 1.6 and the ratio Δa*T/ΔTL is 0.8.

With comparative example C4, where the layer does not have the absorption profile according to the invention, the green color in transmission is not significantly attenuated (a*T goes from −5.97 to −5.52). The ratio Δa*T/ΔTL is: 1.3, which is insufficient.

In one variant, the absorbent layer of example 1 could be deposited on any of the other surfaces of the double glazing.

In the case of a laminated glazing, the absorbent layer could be in contact with the lamination interlayer, without any particular difficulty.

The invention can be applied to other configurations (triple glazing, etc.)

The invention is not restricted to the use of functional coatings with high $T_L$, nor to functional coatings with three silver layers.

The invention claimed is:

1. A material comprising at least one transparent substrate, each substrate comprising two main surfaces, one of the two main surfaces of one of the at least one substrate is coated with a functional coating capable of controlling solar radiation and/or infrared radiation, the functional coating comprising at least one metallic functional layer, each arranged between two dielectric coatings, wherein the material includes at least one absorbent layer that has an average absorption peak
   centered between 500 and 555 nm; and
   whose full width at half maximum is less than 50 nm.

2. The material according to claim 1, wherein the at least one absorbent layer comprises an organic pigment.

3. The material according to claim 1, equipping a building or passenger compartment, the material delimiting an interior and exterior of the building or of the passenger compartment, the material comprising at least two transparent substrates, wherein surfaces of each substrate being numbered from the exterior toward the interior of the building or of the passenger compartment, wherein the functional coating is arranged on the interior surface of the outermost substrate corresponding to (surface 2).

4. The material according to claim 1, comprising at least two transparent substrates and a lamination interlayer, wherein the at least one absorbent layer consists of the lamination interlayer which includes an organic pigment.

5. The material according to claim 1, wherein the at least one absorbent layer consists of one of the at least one substrate.

6. The material according to claim 1, wherein the at least one absorbent layer is a layer deposited on one of the surfaces of the at least one substrate.

7. The material according to claim 6, wherein the layer deposited by wet-coating.

8. The material according to claim 1, wherein the functional coating comprises one or more silver-based functional layers, each arranged between two dielectric coatings.

9. The material according to claim 1, wherein the substrate is made of glass or of polymer organic material.

10. The material according to claim 1, wherein the functional coating comprising at least one metallic functional layer and the absorbing layer are not directly in contact with one other.

11. A glazing comprising a material according to claim 1, wherein the glazing is in the form of a monolithic, laminated and/or multiple glazing.

12. The material according to claim 1, wherein the at least one absorbent layer has an average absorption peak centered between 510 and 540 nm; and whose full width at half maximum is less than 40 nm.

13. The material according to claim 9, wherein the substrate is made of soda-lime-silica glass.

* * * * *